(12) United States Patent
Papendorf et al.

(10) Patent No.: US 7,762,611 B2
(45) Date of Patent: Jul. 27, 2010

(54) CONVERTIBLE ROOF FOR A PASSENGER VEHICLE

(75) Inventors: Marcus Papendorf, Bönnigheim (DE); Gernot Bruder, Karlsruhe (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 282 days.

(21) Appl. No.: 12/103,054

(22) Filed: Apr. 15, 2008

(65) Prior Publication Data

US 2008/0258490 A1 Oct. 23, 2008

(30) Foreign Application Priority Data

Apr. 17, 2007 (DE) .................. 10 2007 018 017

(51) Int. Cl.
*B60J 7/00* (2006.01)
(52) U.S. Cl. .................. 296/107.17; 296/107.16; 296/108; 296/132
(58) Field of Classification Search ........... 296/107.08, 296/107.16, 107.17, 107.2, 108, 124, 131, 296/132

See application file for complete search history.

(56) References Cited

U.S. PATENT DOCUMENTS

| | | | | |
|---|---|---|---|---|
| 4,929,015 A | * | 5/1990 | Bauer | .................. 296/116 |
| 6,811,205 B2 | | 11/2004 | Salz et al. | |
| 2003/0218355 A1 | * | 11/2003 | Stenvers et al. | ............. 296/108 |
| 2004/0094987 A1 | | 5/2004 | Salz et al. | |
| 2007/0018478 A1 | * | 1/2007 | Martin | .................. 296/107.08 |

FOREIGN PATENT DOCUMENTS

| | | |
|---|---|---|
| DE | 869 159 | 4/1953 |
| DE | 100 21 333 C1 | 8/2001 |
| DE | 201 12 267 U1 | 1/2003 |
| WO | WO 03/047896 A1 | 6/2003 |

* cited by examiner

*Primary Examiner*—Lori L Lyjak
(74) *Attorney, Agent, or Firm*—Brooks Kushman P.C.

(57) ABSTRACT

An assembly includes a roof having front and rear roof parts, a motion system, and a coupling rod. The motion system includes front and rear guide rods, a spring, and a guide rod mechanism to move the roof between closed and opened positions. The front guide rod is fixed to the front roof part and is pivotably supportable on a bearing. The rear guide rod is fixed to the rear roof part and is pivotably supportable on a bearing. The coupling rod is articulately connected to the front guide rod and to the rear roof part. The spring is articulately connected to the front guide rod and to the guide rod mechanism which is articulately connected to the rear guide rod such that the spring is biased to open the roof when the roof is closed and is biased to close the roof when the roof is opened.

20 Claims, 5 Drawing Sheets

CONVERTIBLE ROOF FOR A PASSENGER VEHICLE

CROSS-REFERENCE TO RELATED APPLICATIONS

This application claims foreign priority benefits under 35 U.S.C. §119(a)-(d) to DE 10 2007 018 017.0, filed Apr. 17, 2007, which is hereby incorporated by reference in its entirety.

BACKGROUND OF THE INVENTION

1. Field of the Invention

The present invention relates to a multi-part convertible vehicle roof.

2. Background Art

EP 1 361 966 B1 (corresponding to U.S. Pat. No. 6,811,205) describes a multi-part convertible roof. A kinematic system moves the roof between closed and opened positions. A spring is between the kinematic system and a rotary bearing on the vehicle body. When the roof is in either position, the spring acts on the kinematic system in a direction towards the other position. The kinematic system includes a drive rod and a guide rod, which are supported on the vehicle body and connected to the spring, and a C-pillar guide rod situated therebetween.

DE 100 21 333 C1 describes a multi-part convertible roof. A kinematic system moves the roof between closed and opened positions. A spring engages with and releases the kinematic system from a dead-center position when a Bowden cable is actuated thus allowing the roof to move into the closed position.

DE 869 159 describes a multi-part convertible roof. A kinematic system moves the roof between closed and opened positions. The kinematic system has a hoop articulately supported on the vehicle body and which by connection of a drive mechanism is acted on by a motor to move the roof.

SUMMARY OF THE INVENTION

An object of the present invention includes a multi-part convertible vehicle roof actuable by simple technical means which may be economically realized while maintaining satisfactory function.

In carrying out the above object and other objects, the present invention provides an assembly. The assembly includes a roof having a front roof part and a rear roof part as viewed in a forward direction of vehicle travel. The assembly further includes a motion system for enabling the roof to be moved between a closed position in which the roof parts are in contact with one another and extend from one another along a roof line and an opened position in which the roof parts are away from and folded over one another beneath the roof line. The motion system includes a front guide rod having first and second sections which are at an approximate right angle relative to one another. The first section of the front guide rod is fixed to the front roof part and the second section of the front guide rod is pivotably supportable on a first rotary bearing. The motion system further includes a rear guide rod having first and second sections which are at an approximate right angle relative to one another. The first section of the rear guide rod is fixed to the rear roof part and the second section of the rear guide rod is pivotably supportable on a second rotary bearing. The assembly further includes a coupling rod which is articulately connected at one end to the first section of the front guide rod and is articulately connected at an opposite end to the rear roof part. The motion system further includes a spring and a guide rod mechanism. The spring is articulately connected at one end to the second section of the front guide rod and is articulately connected at an opposite end to the guide rod mechanism and the guide rod mechanism is articulately connected to the second section of the rear guide rod such that the spring is biased to move the roof towards the opened position when the roof is in the closed position and is biased to move the roof towards the closed position when the roof is in the opened position.

Advantages associated with embodiments of the present invention are that the cooperation of the roof parts with the guide rods and the supporting of the spring on the front guide rod as well as on the rear guide rod by connection of the guide rod mechanism ensures excellent control of the roof parts. The guide rod mechanism between the guide rods of the roof parts meets standards for movable roofs in automotive engineering. In addition, the roof or the roof parts are easily actuated between closed and opened positions. The spring in conjunction with the guide rod mechanism causes the roof or roof parts to assume a type of static equilibrium state in all positions, from the closed to the opened position and from the opened to the closed position, which contributes toward being able to easily actuate the roof manually or via the use of relatively small actuators such as inexpensive, compact low-power electric motors. Components of the assembly may be manufactured with a justifiable level of effort and integrated into a vehicle.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
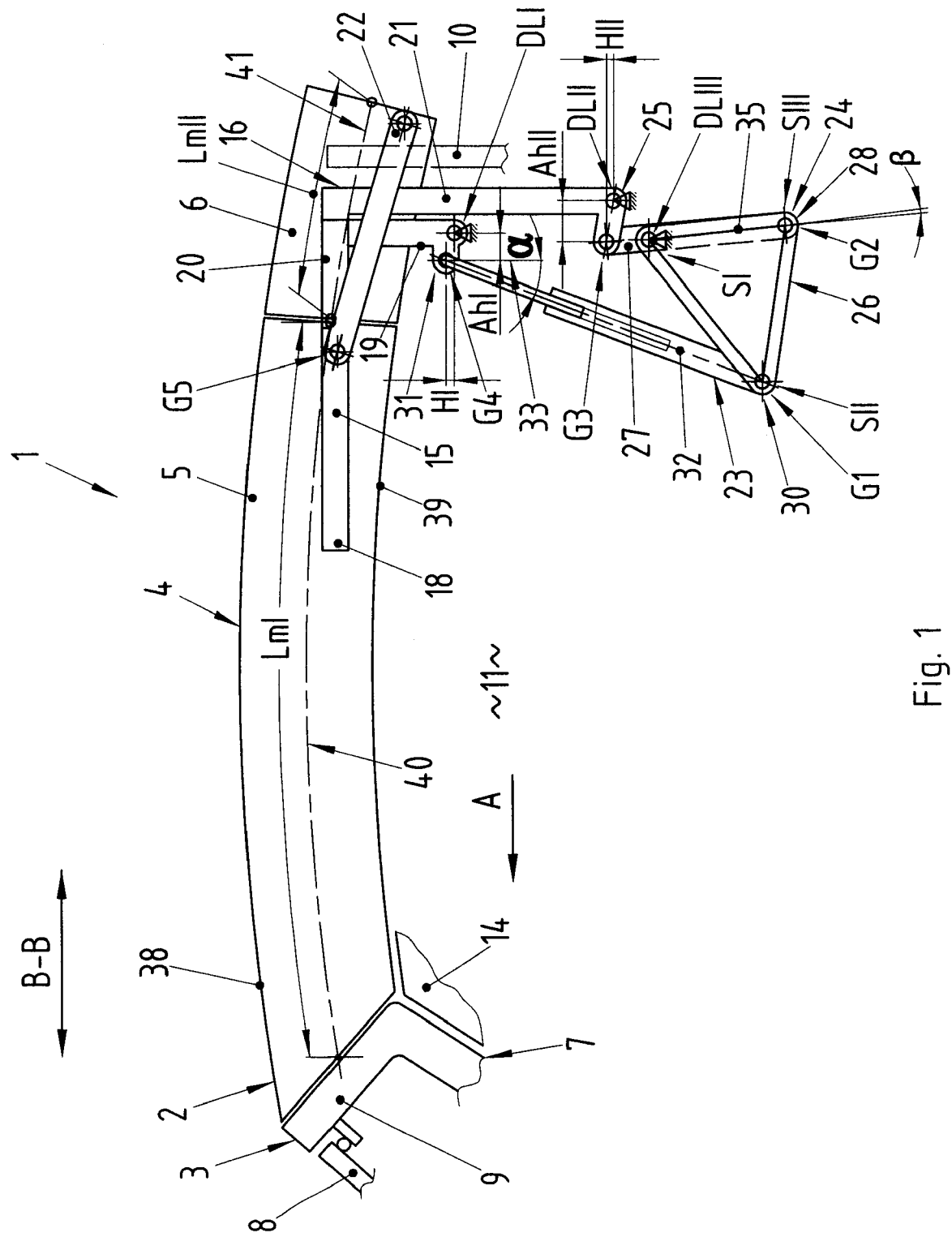
FIG. 1 illustrates a partial side view of a vehicle having a convertible roof in accordance with an embodiment of the present invention with the roof being in a closed position.

Referring now to FIG. 1, a partial side view of a passenger vehicle 1 having a convertible roof 4 in accordance with an embodiment of the present invention is shown. Roof 4 is a multi-part roof and includes roof parts 5, 6. As viewed in the direction of forward vehicle travel A, roof part 5 is a front roof part and roof part 6 is a rear roof part. Vehicle 1 includes a body 2 having a windshield arrangement 3. Windshield arrangement 3 includes a windshield frame 7 which accommodates a windshield 8. The top of windshield frame 7 adjoins a frame section 9 on front roof part 5. Frame section 9 extends transversely to the longitudinal vehicle direction B-B. Rear roof part 6 partially surrounds a vertical rear window 10. Rear window 10 may be pivotable and/or height-adjustable.

Figure 5:
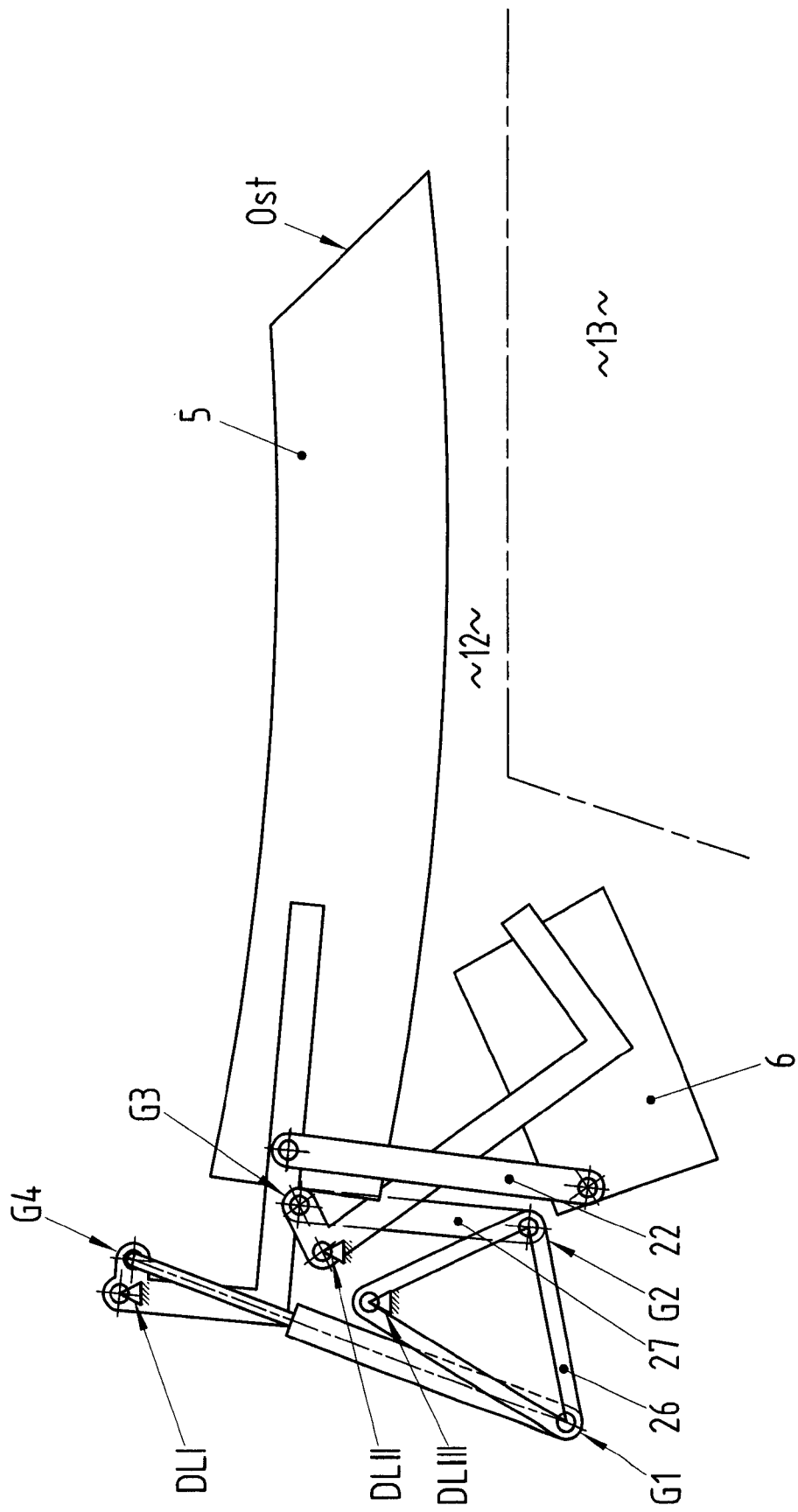
FIG. 5 illustrates a side view corresponding to FIG. 1 with the roof being in the opened position.

Roof 4 is movable between a closed position (shown in FIG. 1) and a lowered opened position Ost (shown in FIG. 5). In the closed position, roof parts 5, 6 extend from one another over a passenger compartment 11 of vehicle body 2 as shown in FIG. 1. In the opened position, roof parts 5, 6 are folded relative to one another and are stored in a space 12 adjacent to a drive mechanism space 13 of vehicle body 2 as shown in FIG. 5. Compartment 11 is accessible via doors provided on opposite sides of vehicle body 2 of which only one window pane 14 is indicated in FIG. 1.

A roof motion device (i.e., a roof kinematic system) 17 is operable to move roof 4 between its closed and opened positions. Roof motion device 17 includes a front guide rod 15 and a rear guide rod 16. Front guide rod 15 is associated with front roof part 5 and includes a horizontal guide rod section 18 and a vertical guide rod section 19. Front guide rod 15 is attached to front roof part 5 via guide rod section 18 and is articulately connected to a first rotary bearing DLI on vehicle body 2 via guide rod section 19. Rear guide rod 16 is associated with rear roof part 6 and includes a horizontal guide rod section 20 and a vertical guide rod section 21. Rear guide rod 16 is attached to rear roof part 6 via guide rod section 20 and is pivotably supported on a second rotary bearing DLII on vehicle body 2 via guide rod section 21.

Roof motion device 17 further includes a spring 23 and a guide rod mechanism 24. Spring 23 has a bottom end 30 and a top end 31. Top end 31 of spring 23 is connected to guide rod section 19 of front guide rod 15 such that spring 23 is mechanically linked to front guide rod 15. Bottom end 30 of spring 23 is connected to guide rod mechanism 24 which is connected to guide rod section 21 of rear guide rod 16 such that spring 23 is mechanically linked to rear guide rod 16.

Guide rod mechanism 24 includes a reversing lever 26 and a control lever 27. Reversing lever 26 is supported on vehicle body 2 via a third rotary bearing DLIII. Reversing lever 26 is connected to bottom end 30 of spring 23 via a first articulated joint G1 and is connected to a first end 28 of control lever 27 via a second articulated joint G2. The second end of control lever 27 cooperates with rear guide rod 16 via a third articulated joint G3. Bottom end 30 of spring 23 is supported on first articulated joint G1. Top end 31 of spring 23 is supported on a fourth articulated joint G4 of front guide rod 15.

As a result of these connections, spring 23 is biased to move roof 4 towards the opened position when roof 4 is in the closed position and is biased to move roof 4 towards the closed position when roof 4 is in the opened position. Roof parts 5, 6 assume a type of static equilibrium such that roof parts 5, 6 may be moved either manually or by an actuator from an intermediate position between the closed and opened positions to either the closed or opened position.

The actuator may be an electric motor 25 situated on guide rod mechanism 24, for example, on the second rotary bearing DLII or at another suitable position.

When roof 4 is in the closed position, as viewed in the direction of forward vehicle travel A, fourth articulated joint G4 is situated in front of first rotary bearing DLI (designated by horizontal distance AhI) and third rotary bearing G3 is situated in front of second rotary bearing DLII (designated by horizontal distance AhII). A center longitudinal axis 32 of spring 23 has a vertical or slightly inclined orientation. In the embodiment, center longitudinal axis 32 is inclined opposite the direction of forward vehicle travel A and defines an acute angle α with respect to a vertical 33. Fourth articulated joint G4, which intersects center longitudinal axis 32 of spring 23, is located above first rotary bearing DLI (designated by vertical distance HI). Third articulated joint G3 is located above second rotary bearing DLII (designated by vertical distance HII).

Third rotary bearing DLIII, first articulated joint G1, and second articulated joint G2 of reversing lever 26 are determined by side intersection points SI, SII, and SIII of a triangle. Second articulated joint G2, third rotary bearing DLIII, and third articulated joint G3 lie on a common straight line 35. Straight line 35 is vertical or has a slight inclination (angle β) in the direction of forward vehicle travel A. Fourth articulated joint G4 is on a bend 36 in front guide rod 15 and third articulated joint G3 is on a bend 37 in rear guide rod 16 (see FIG. 2).

Viewed in the direction of forward vehicle travel A, front roof part 5 has a length LmI and rear roof part 6 has a length LmII. Length LmI of front roof part 5 is measured along a front roof line 40 of front roof part 5 between opposite side lines 38, 39 of roof 4. Similarly, length LmII of rear roof part 6 is measured along a rear roof line 41 of rear roof part 6 between opposite side lines 38, 39 of roof 4. Length LmI of front roof part 5 is roughly four or five times greater than length LmII of rear roof part 6.

A coupling rod 22 acts between roof parts 5, 6. Coupling rod 22 cooperates with front roof part 5 via a fifth articulated joint G5 and cooperates with rear roof part 6 via a sixth articulated joint G6. Fifth articulated joint G5 and sixth articulated joint G6 are respectively situated adjacent to the rear regions of roof parts 5, 6. In particular, coupling rod 22 is articulately connected at one end to guide rod section 18 of front guide rod 15 at a rear region of front roof part 5 via fifth articulated joint G5. Coupling rod 22 is articulately connected at its other end to a rear region of rear roof part 6 via sixth articulated joint G6. Coupling rod 22 is aligned in a relatively horizontal or flat orientation when roof 4 is in the closed position.

When roof 4 is in the closed position, spring 23 acts on front guide rod 15 associated with front roof part 5 and is supported on reversing lever 26 of guide rod mechanism 24. Reversing lever 26 transmits elastic force from spring 23 via control lever 27 of guide rod mechanism 24 to rear guide rod 16 associated with rear roof part 6. When this occurs, rear guide rod 16 is likewise acted on by elastic force in a direction toward the opened position of roof 4. As such, the elastic force from spring 23 is biased to move roof parts 5, 6 towards the opened position.

Figure 2:
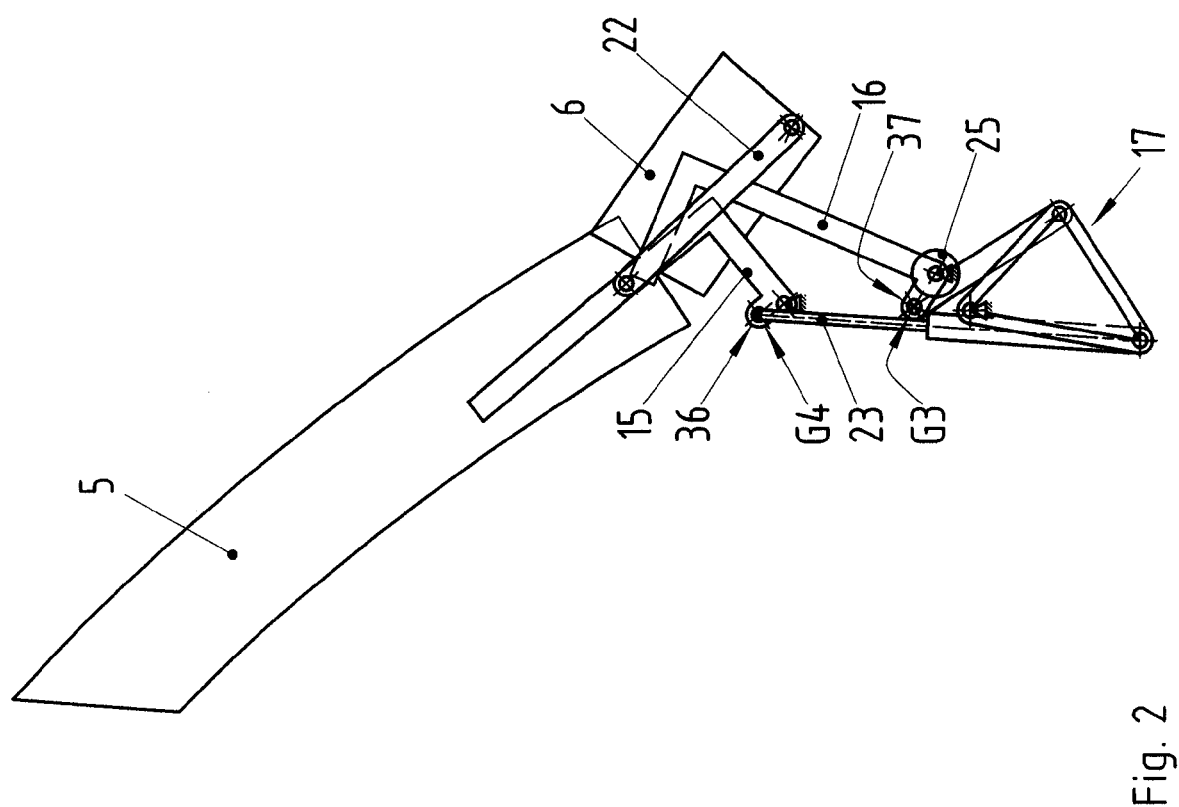
FIG. 2 illustrates a side view corresponding to FIG. 1 with the roof being a first intermediate position between the closed position and an opened position.

Referring now to FIG. 2, roof 4 is in a first intermediate position between the closed and opened positions. In this first intermediate position, roof 4 is approximately 20% opened. The effective leverage of spring 23 becomes smaller with respect to roof parts 5, 6. Necessary drive force is also accordingly reduced.

Figure 3:
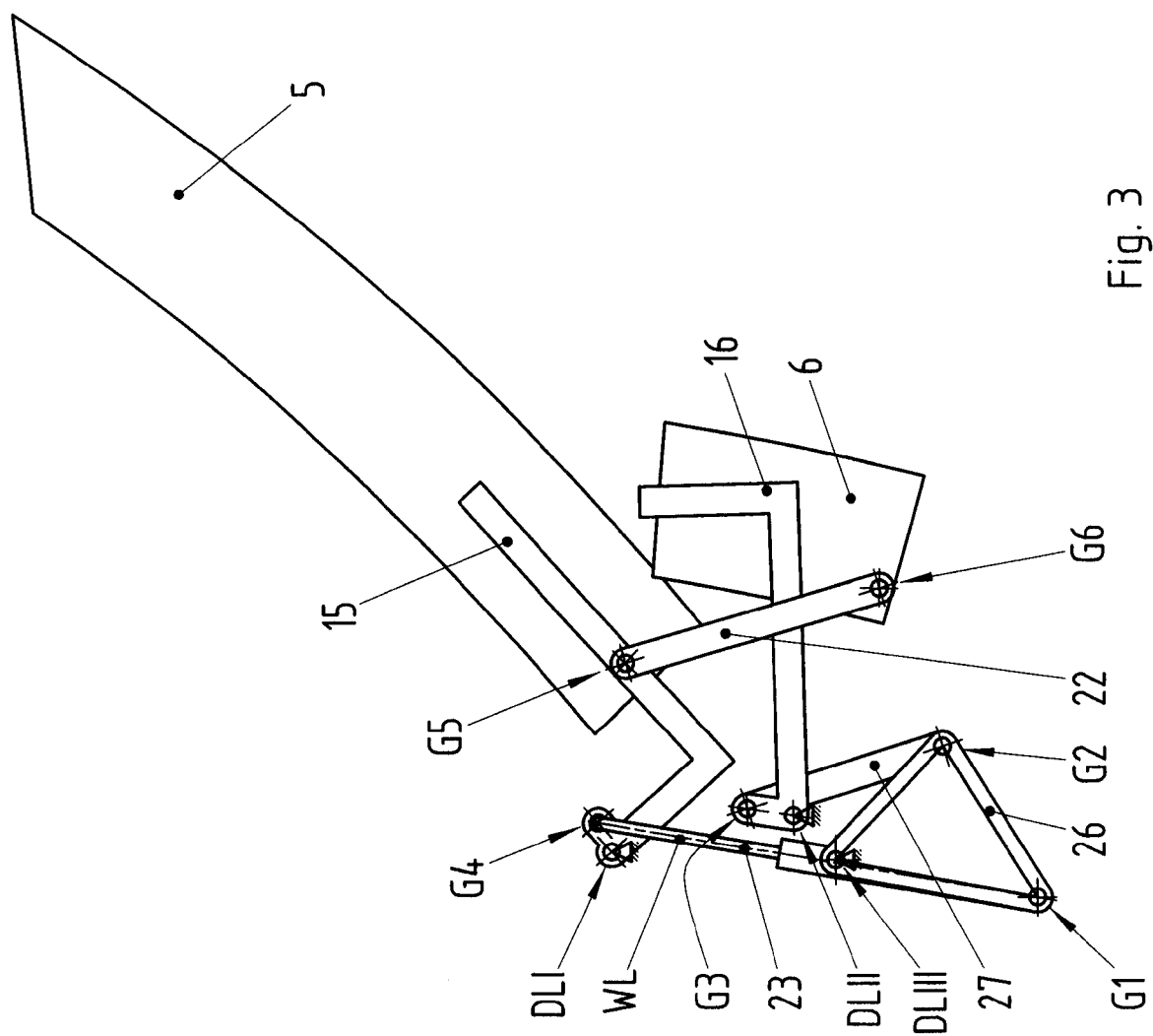
FIG. 3 illustrates a side view corresponding to FIG. 1 with the roof being in a second intermediate position between the first intermediate position and the opened position.

Referring now to FIG. 3, roof 4 is in a second intermediate position between the first intermediate and opened positions. In this second intermediate position, roof 4 is approximately 60% opened. The line of action WL of spring 23 has become reversed with respect to roof parts 5, 6. At this point, spring 23 decelerates both roof parts 5, 6 such that roof parts 5, 6 maintain their intended stable position and do not undesirably move into the opened position. Control lever 27 of guide rod mechanism 24 travels past second rotary bearing DLII of rear guide rod 16.

Figure 4:
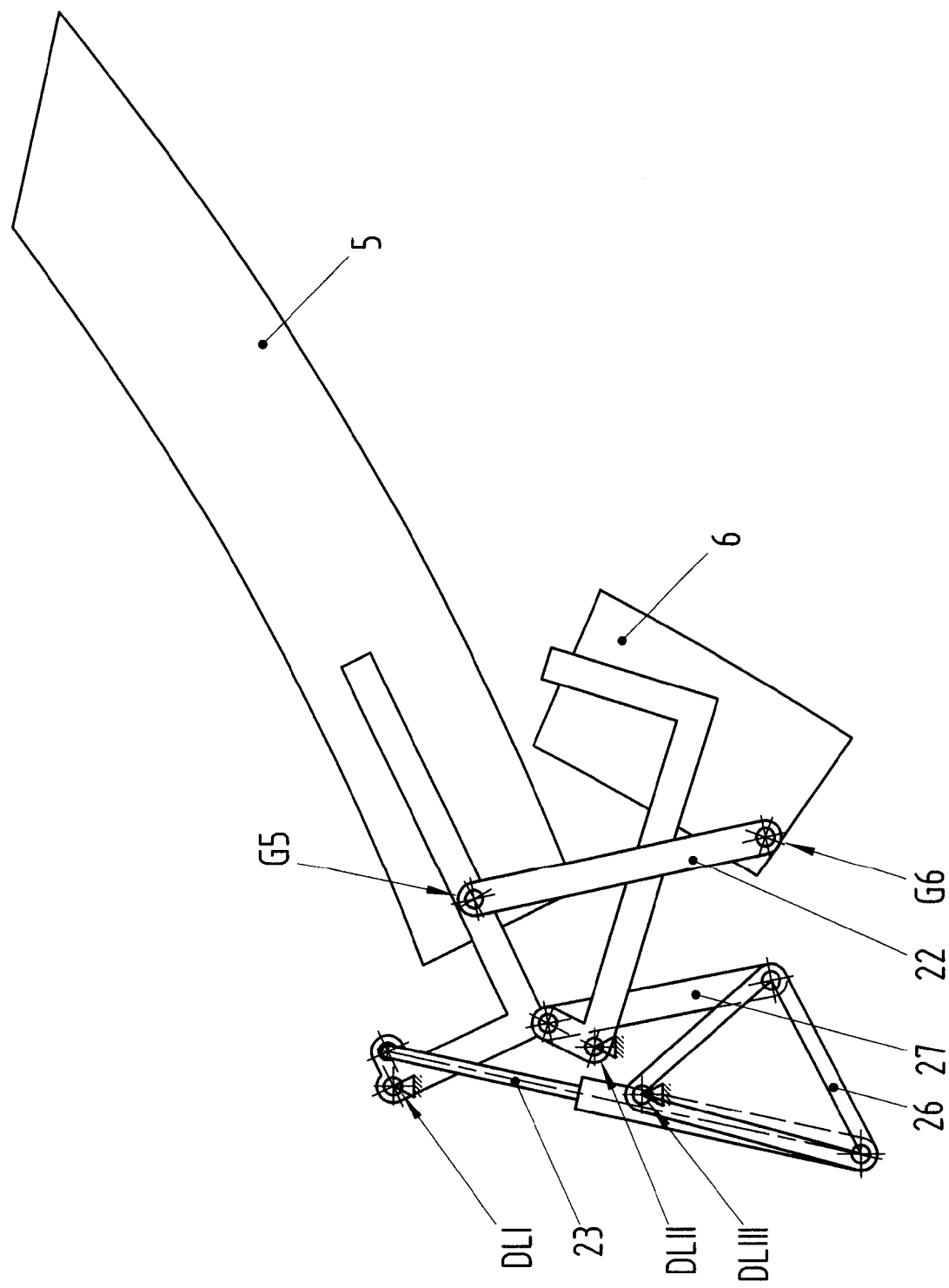
FIG. 4 illustrates a side view corresponding to FIG. 1 with the roof being in a third intermediate position between the second intermediate position and the opened position.

Referring now to FIG. 4, roof 4 is in a third intermediate position between the second intermediate and opened positions. In this third intermediate position, roof 4 is approximately 80% open.

Referring now to FIG. 5, roof 4 is in the opened position. In the opened position, spring 23 exerts a maximum effective leverage such that the force produced by the weight and position of roof 4 is compensated.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An assembly comprising:
    a roof having a front roof part and a rear roof part as viewed in a forward direction of vehicle travel;
    a motion system for enabling the roof to be moved between a closed position in which the roof parts are in contact with one another and extend from one another along a roof line and an opened position in which the roof parts are away from and folded over one another beneath the roof line;
    the motion system including a front guide rod having first and second sections which are at an approximate right angle relative to one another, wherein the first section of the front guide rod is fixed to the front roof part and the second section of the front guide rod is pivotably supportable on a first rotary bearing;
    the motion system including a rear guide rod having first and second sections which are at an approximate right angle relative to one another, wherein the first section of the rear guide rod is fixed to the rear roof part and the second section of the rear guide rod is pivotably supportable on a second rotary bearing; and
    a coupling rod articulately connected at one end to the first section of the front guide rod and articulately connected at an opposite end to the rear roof part;
    the motion system including a spring and a guide rod mechanism, wherein the spring is articulately connected at one end to the second section of the front guide rod and is articulately connected at an opposite end to the guide rod mechanism and the guide rod mechanism is articulately connected to the second section of the rear guide rod such that the spring is biased to move the roof towards the opened position when the roof is in the closed position and is biased to move the roof towards the closed position when the roof is in the opened position.

2. The assembly of claim 1 wherein:
    the guide rod mechanism includes a reversing lever and a control lever.

3. The assembly of claim 2 wherein:
    the reversing lever is pivotably supportable on a third rotary bearing, articulately connected at one end to the opposite end of the spring via a first articulated joint, and articulately connected to an end of the control lever via a second articulated joint;
    wherein an opposite end of the control lever is articulately connected to the second section of the rear guide rod via a third articulated joint.

4. The assembly of claim 3 wherein:
    the opposite end of the spring engages with the first articulated joint and the one end of the spring engages with a fourth articulated joint on the second section of the front guide rod.

5. The assembly of claim 4 wherein:
    when the roof is in the closed position the fourth articulated joint is situated in front of the first rotary bearing as viewed in the forward direction of vehicle travel.

6. The assembly of claim 4 wherein:
    when the roof is in the closed position, the third articulated joint is situated in front of the second rotary bearing as viewed in the forward direction of vehicle travel.

7. The assembly of claim 1 wherein:
    the spring has a slightly inclined orientation.

8. The assembly of claim 7 wherein:
    the spring is inclined opposite the forward direction of vehicle travel at an acute angle.

9. The assembly of claim 4 wherein:
    the fourth articulated joint is located above the first rotary bearing.

10. The assembly of claim 4 wherein:
    the third articulated joint is located above the second rotary bearing.

11. The assembly of claim 4 wherein:
    the position of the third rotary bearing, the first articulated joint, and the second articulated joint of the reversing lever are determined by side intersection points of a triangle.

12. The assembly of claim 4 wherein:
    the second articulated joint, the third rotary bearing, and the third articulated joint lie on a common straight line.

13. The assembly of claim 12 wherein:
    the straight line has a slight inclination in the direction of forward vehicle travel.

14. The assembly of claim 4 wherein:
    the fourth articulated joint is on a bend in the second section of the front guide rod.

15. The assembly of claim 4 wherein:
    the third articulated joint is on a bend in the second section of the rear guide rod.

16. The assembly of claim 1 wherein:
    the front roof part has a length along the forward direction of vehicle travel and the rear roof part has a length along the forward direction of vehicle travel, wherein the length of the front roof part is at least four times greater than the length of the rear roof part.

17. The assembly of claim 1 wherein:
    the front roof part has a length along the forward direction of vehicle travel and the rear roof part has a length along the forward direction of vehicle travel, wherein the length of the front roof part is less than five times greater than the length of the rear roof part.

18. The assembly of claim 1 wherein:
    the roof may be manually actuated to move between the closed and opened positions.

19. The assembly of claim 1 further comprising:
    an actuator which engages the guide rod mechanism;
    wherein the roof may be actuated in response to the actuator actuating the guide rod mechanism to move between the closed and opened positions.

20. The assembly of claim 19 wherein:
    the actuator is a motor.

* * * * *